United States Patent

[11] 3,589,274

| [72] | Inventor | Robert P. Murray<br>7835 4th St., Downey, Calif. 90241 |
|---|---|---|
| [21] | Appl. No. | 880,824 |
| [22] | Filed | Nov. 28, 1969 |
| [45] | Patented | June 29, 1971 |

[54] CONTINUOUS FEED TOASTER
10 Claims, 5 Drawing Figs.

[52] U.S. Cl. .................................................. 99/349,
99/346, 99/352, 99/386, 99/400, 99/443, 99/446,
118/13, 118/257
[51] Int. Cl. ...................................................... A47j 37/08
[50] Field of Search............................................. 118/13,
257; 99/349, 385, 352, 386, 400, 443, 446, 346

[56] References Cited
UNITED STATES PATENTS

| 1,633,391 | 6/1927 | Beskin............................ | 99/352 UX |
|---|---|---|---|
| 1,666,335 | 4/1928 | Lentz............................. | 99/386 X |
| 2,804,818 | 9/1957 | March............................ | 99/352 X |
| 2,828,714 | 4/1958 | Sandberg....................... | 99/352 X |
| 3,033,099 | 5/1962 | Marriott........................ | 99/349 |
| 3,126,813 | 3/1964 | Marriott........................ | 99/349 |
| 3,156,178 | 11/1964 | Kormos......................... | 99/385 UX |
| 3,517,605 | 6/1970 | Hursch et al.................. | 99/349 X |

Primary Examiner—Billy J. Wilhite
Attorney—Fulwider, Patton, Rieber, Lee and Utecht

ABSTRACT: A continuous feed toaster having a housing with a bed formed with an opening across which toastable articles of food are moved by a conveyor. An applicator in the housing includes a shortening reservoir and an endless belt movable through the reservoir and along the bed opening to pick up and apply shortening to one side of the food articles as they are moved past the opening. A grill in the housing toasts the food articles after they are "buttered" with the shortening. A plurality of eccentrically mounted weights are arranged to sequentially engage and press the foodstuffs against the bed.

PATENTED JUN29 1971

INVENTOR.
ROBERT P. MURRAY
BY Fulwider, Patton, Rieber,
Lee and Utecht
ATTORNEYS

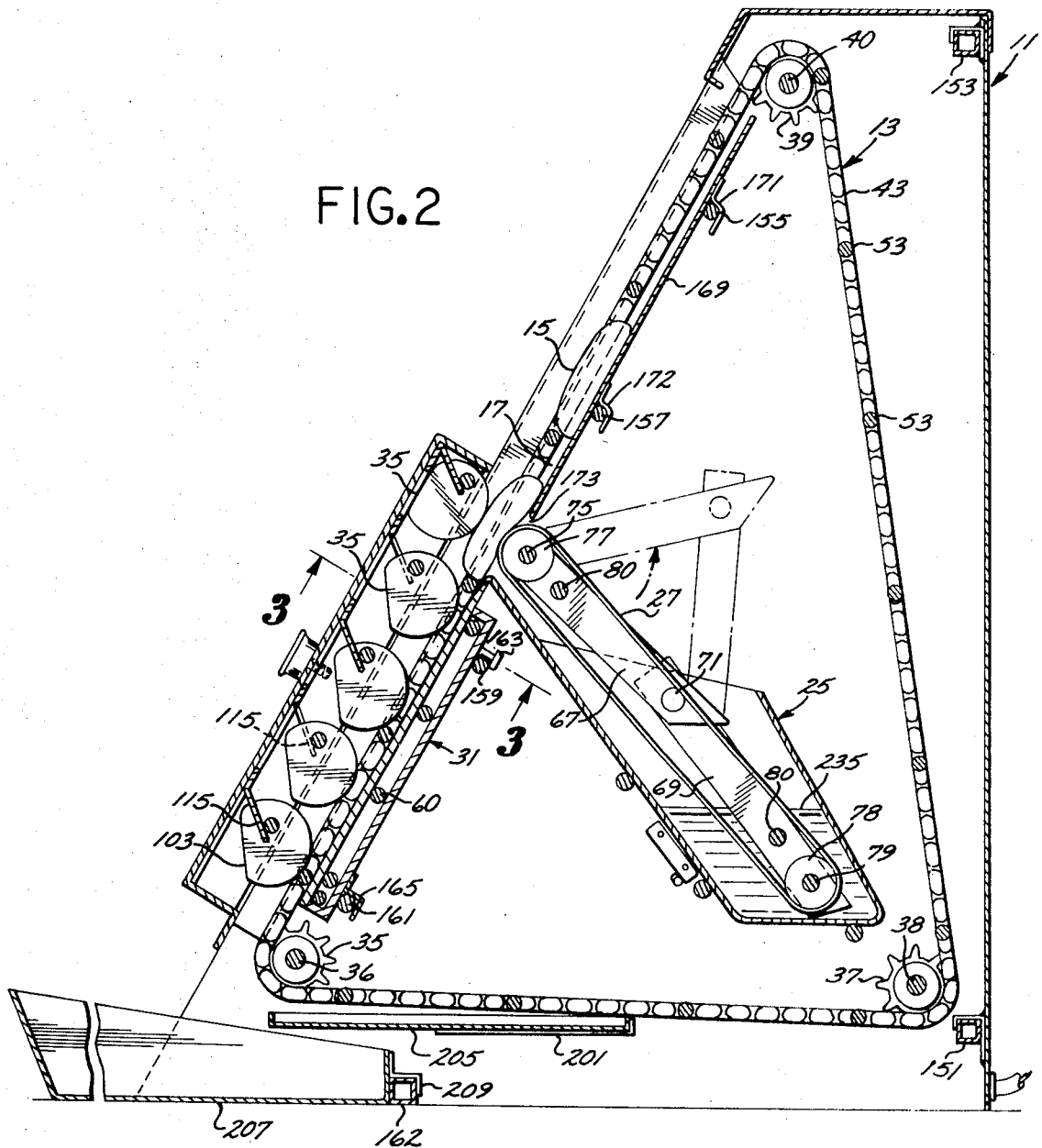

3,589,274

CONTINUOUS FEED TOASTER

BACKGROUND OF THE INVENTION

1. Field of the invention

The present invention relates to automatic, high production toasters which automatically toast and apply shortening to articles of food.

2. Description of the Prior Art

Many prior art high production toasters include elongated leaf springs formed with free extremities to press articles of food such as sandwich buns downwardly toward a shortening or butter applicator and also toward a grill for toasting. Such springs are unsatisfactory because a sudden accidental blow to the toaster housing, for example, can deflect the free extremities of such springs and cause them to dig into the sandwich buns, jamming the equipment, interrupting production, and causing damage to the springs. Moreover, prior art toasters utilize shortening applicators of a type in which application is by a roller partially submerged in a shortening reservoir. Consequently, for a practical size of roller only a limited quantity of stored shortening can be reached by the roller, which necessitates frequent refilling of the reservoir.

SUMMARY OF THE INVENTION

The continuous feed toaster of the present invention is characterized by a conveyor means which continuously feeds food articles past a shortening applicator which includes an endless belt having one portion disposed in a reservoir of shortening and another portion extending adjacent the conveyor for engagement with the food carried by said conveyor. A grill is disposed on the same side of the conveyor as the applicator and a plurality of movable weights are spaced along the opposite side of such conveyor, normally hanging in the path of the foodstuffs passing along the conveyor. Thus, foodstuffs placed on the conveyor are carried under the weights and past the belt and grill whereby the weights bias the foodstuffs toward the belt and grill for application of shortening thereto and toasting thereof.

An object of the present invention is to provide a continuous feed toaster of the type described in which the endless belt is supported by a frame having two portions which can be pivoted or knuckled to retract the belt from the reservoir, thereby enabling convenient removal of the reservoir.

Another object of the present invention is to provide a continuous feed toaster of the type described wherein the housing is of the knockdown-type which can be easily disassembled and reassembled.

These and other objects and the advantages of the present invention will become apparent from a consideration of the following detailed description when taken in conjunction with the following drawings.

DESCRIPTION OF THE DRAWINGS

FIG. 2 is an enlarged vertical sectional view taken along the line 2-2 of FIG. 1;

DESCRIPTION OF THE PREFERRED EMBODIMENT

Figure 1:
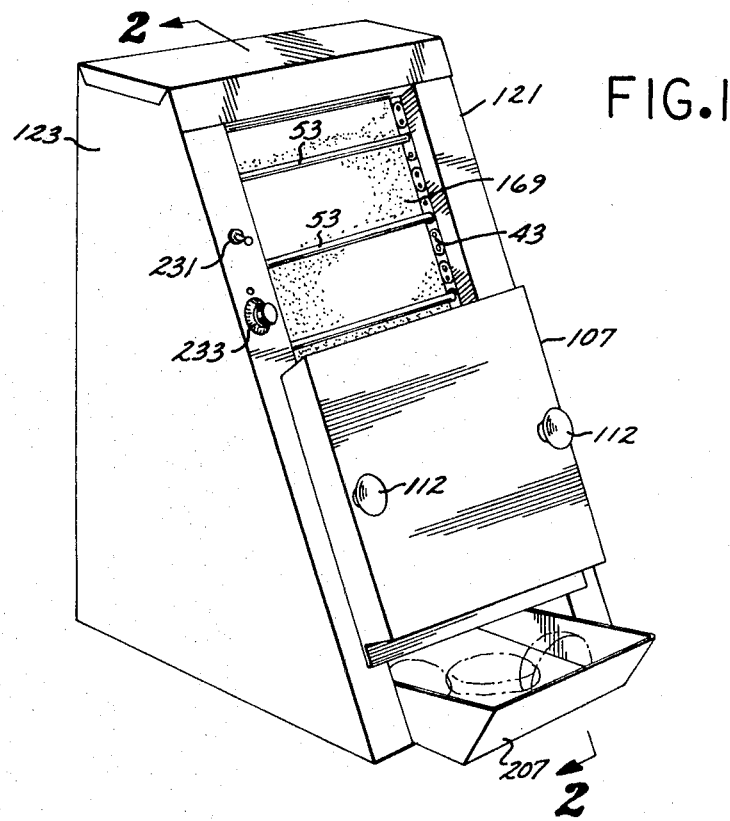
FIG. 1 is a perspective view of a continuous feed toaster embodying the present invention.
Figure 4:
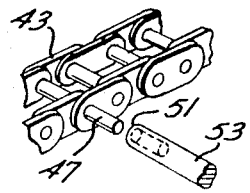
FIG. 4 is an enlarged fragmentary perspective view of a portion of the conveyor of the continuous feed toaster shown in FIG. 1.

Referring to FIGS. 1 and 2, the continuous feed toaster of the present invention includes, generally, a housing 11 having a conveyor 13 mounted therein and rotatable in a counterclockwise direction, as viewed in FIG. 2, for conveying articles of food such as sandwich buns 15 downwardly along an inclined path 17 for toasting and buttering. A shortening applicator 21 is disposed on one side of the path 17 and includes an open top reservoir 25 and an endless applicator belt 27 having a lower portion extending downwardly into the reservoir 25. An upper portion of the belt 27 passes adjacent the path 17. Also disposed adjacent the applicator 21, but below the upper portion of the belt 27, is a grill 31 for toasting the bread 15 as it passes along the path.

On the side of the path 17 opposite the applicator 21 and the grill 31 are a plurality of eccentrically mounted pivotal weights 35 suspended in the path of the downwardly moving buns 15 for sequential engagement therewith. The weights 35 are pivoted upwardly by the buns 15, and the weights 35 thus maintain a steady downward bias on the buns 15 as they move downwardly and across the upper portion of the applicator belt 27, and thereafter past the grill 31. During this sequence shortening is applied to the underside of the buns 15 and they are immediately toasted by the grill 31.

Figure 5:
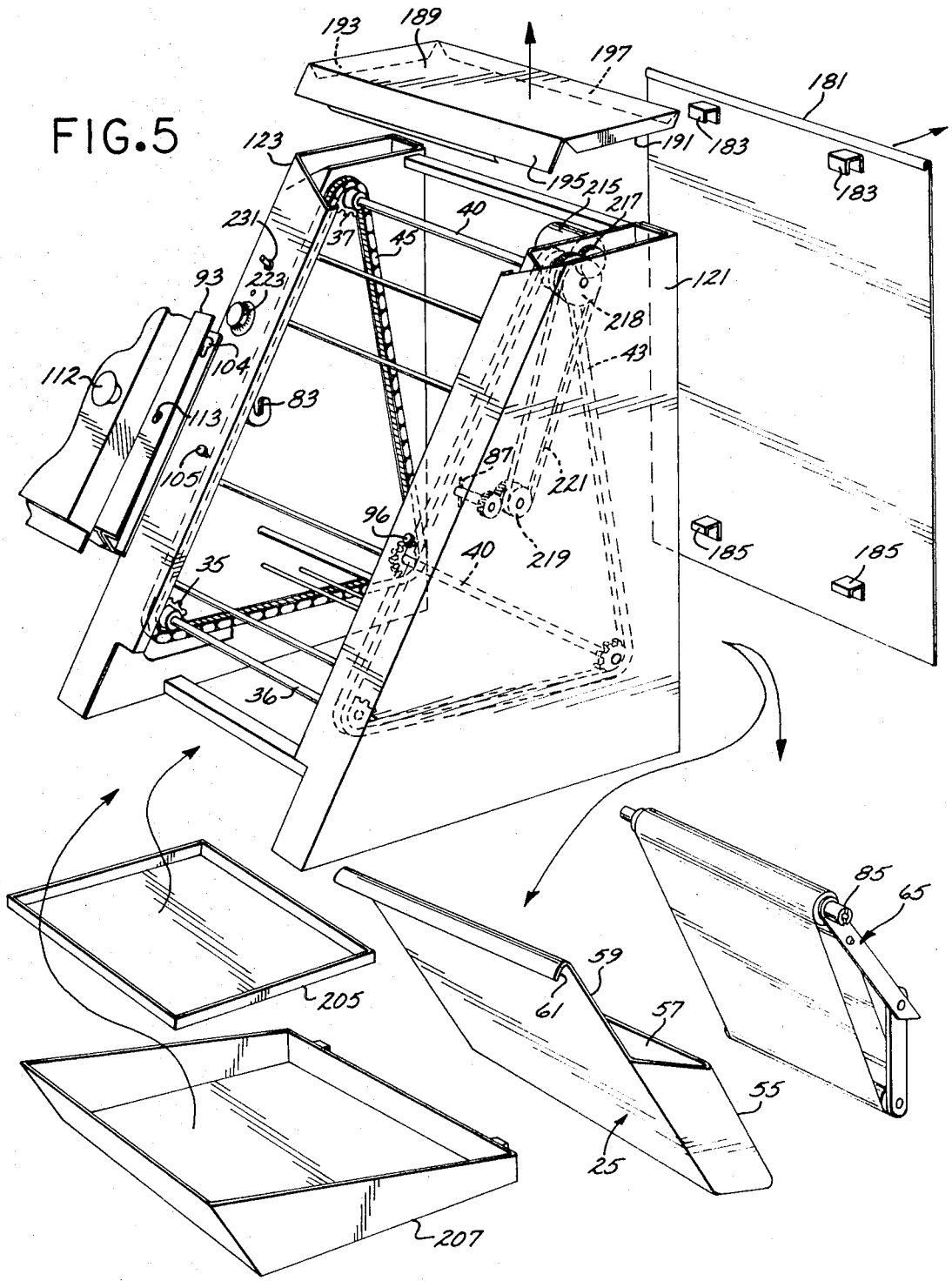
FIG. 5 is an enlarged, exploded view of the continuous feed toaster shown in FIG. 1.

Referring now to FIGS. 2 and 5, the conveyor 13 includes three pairs of sprockets 35, 37 and 39 which are arranged at the front, rear, and top, respectively of the housing 11. The sprockets of each pair are mounted on opposite sides of the housing 11, and are connected together by shafts 36, 38 and 40, respectively. Trained over the sets of sprockets 35, 37 and 39 are chains 43 and 45 which include inwardly projecting aligned pairs of hanger pins 47. The pins 47 project into open ended bores 51 formed in the opposite ends of horizontally disposed cross rods 53.

The reservoir 25 includes a vertically elongated tank 55 having an open top 57 and an upwardly extending apron 59. The upper extremity of the apron 59 includes a reversely formed mounting flange 61 that hooks over the upper extremity of the grill 31 FIG. 2).

As best shown in FIG. 2, a shortening heater 60 is mounted from the housing 11 in heat exchange relationship with the tank 55.

The endless belt 27 is carried on a frame which includes at each side a pair of elongated upper and lower side members 67 and 69 which overlap and are pivoted together at their overlapping extremities by pivot pins 71. The upper extremity of the frame 65 includes a shaft 75 which carries a roller 77 over which the endless belt 27 is trained. A complemental lower roller 78 is located at the bottom extremity of the frame 65, being mounted upon a shaft 79 similar to the shaft 75. The frame side members 65 and 69 are mounted to the extremities of the shafts 75 and 79, respectively, and are connected for common pivotal movement by a pair of cross rods 80.

The upper shaft 75 projects beyond opposite sides of the frame 65, the projection on one end forming a journal 81 which is received in an upwardly opening slot in a bearing 83, the projection on the opposite end carrying a slotted connector 85 for selective engagement with the cross pin of a drive shaft 87 which is rotatably carried by the housing 11.

Figure 3:
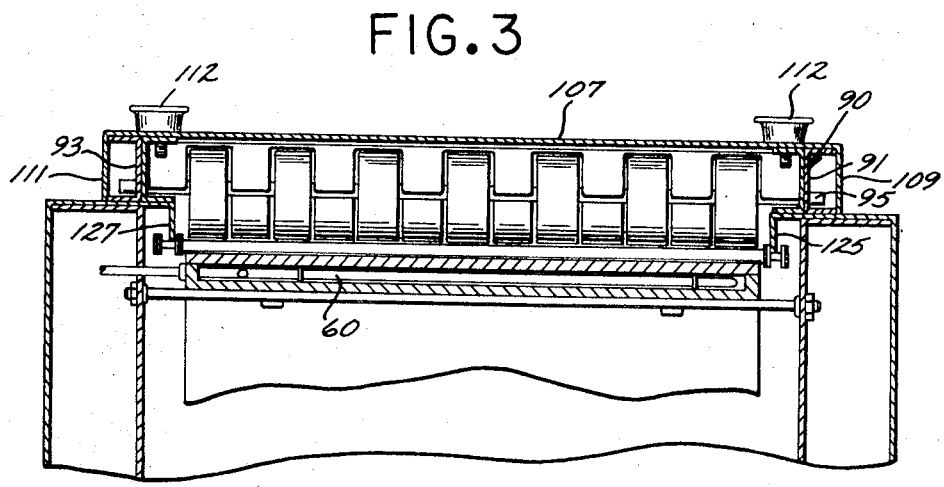
FIG. 3 is a horizontal sectional view taken along the line 3-3 of FIG. 2.

With reference to FIG. 3, the weights 35 are carried by a framework 90 which includes side channels 91 and 93 connected together by crossmembers (not shown). The channels 91 and 93 includes transversely aligned bores in which the opposite ends of a plurality of transverse shafts 95 are carried. The weights 35 are rotatably carried by the shafts 95 in staggered relation for uniform application of pressure upon the sandwich buns 15 passing beneath the weights 35. Referring in particular to FIG. 2, the weights 35 are each generally circular, except for a flattened circumferential portion 103, and the bore through which the associated shaft 95 is disposed is located eccentrically so that the weights always tend to swing downwardly. The flattened portions 103 enable the weights to pivot upwardly a greater distance prior to engagement with an overlying cover 107 of the framework 90.

As best seen in FIG. 5, side channels 91 and 93 include slots 104 for receipt of a pair of mounting pegs 105 carried by the housing 11. The pegs 105 support the framework 90 in position upon the housing 11. A pair of holddown knobs 112 carried by the cover 107 include studs which project through the cover 107 and screw into threaded bores 113 provided in the side channels 91 and 93.

The cover 107 includes downwardly turned marginal side flanges 109 and 111, and a plurality of downwardly projecting guide fingers 115 on its underside. The fingers 115 extend between adjacent weights 35 to maintain the weights in their staggered positions upon the shafts 95.

The housing 11 comprises a pair of sheet metal sidewalls 121 and 123 which are each double-wall in construction so that the central space or chamber acts as a heat insulator. As best seen in FIG. 3, the front portions of the sidewalls 121 and 123 are downwardly and forwardly sloped and include rearwardly turned flanges whose edges define chain guides 125 and 127. The conveyor chains 43 and 45 are engaged and held in proper position by the guides 125 and 127, respectively.

With particular reference to FIG. 2, sidewalls 121 and 123 are connected by transversely oriented crossbars 151, 153, 155, 157, 159, 161 and 162. The crossbars 159 and 161 and engaged by two pairs of hanger brackets 163 and 165 provided on the rear side of the grill 31 to removably support the grill in position.

A pressure plate 169 is located behind the conveyor 13 above the grill 31 and includes two pairs of mounting clips 171 and 172 which hook over crossbars 155 and 157 whereby such pressure plate will be readily removable. The pressure plate 169 terminates in a lower edge 171 spaced from the upper edge of the grill 31 to form an opening 173. The upper portion of the applicator belt 27 passes through the opening 173 to enable shortening to be applied to the sandwich buns 15 being moved along the bed defined by the plate 169 and the grill 31.

The pressure plate 169 includes forwardly turned side flanges 175 which engage the underside of chains 43 and 45 of the conveyor 13.

The housing 11 also includes a backwall 181 having two pairs of mounting clips 183 and 185 on its front side for hooking over the crossbars 153 and 155. The housing 11 further includes a top wall 189 which rests upon the sidewalls 121 and 123, and which includes downwardly turned side flanges 191 and 193 which overlap the top extremities of such sidewalls. The top wall 189 is also provided with downwardly turned front and rear flanges 195 and 197, respectively, which overlie the front portions of the sidewalls 121 and 123 and the rear of the backwall 181.

The sidewalls 121 and 123 include aligned, confronting brackets 201 on their interior lower portions for slidable support of a removable drip pan 205. The pan 205 is located to catch drippings and crumbs from the sandwich buns 15 as they move along the conveyor 13.

A catch tray 107 is inserted in the lower portion of the housing 11 to receive the oil coated or "buttered" buns 15 after they are toasted. The catch tray 207 includes a pair of rearwardly projecting hooks 209 that hook over the crossbar 162 to hold the tray in position.

As best seen in FIG. 5, the present toaster includes a drive motor 215 mounted on the upper portion of the sidewall 121. The drive shaft thereof extends into the hollow portion of the wall 121 and carries a drive pinion 217 which meshes with a drive pinion 216 carried by the upper shaft 40 of the conveyor 13. The shaft 40 also carries a pinion 218 that is coupled to a driven pinion 219 by a drive chain 221. The driven pinion 219 drives the shaft 87, which engages with the coupling 85 on the applicator 21 for driving the belt 27.

As best seen in FIGS. 1 and 5, an on-off switch 231 and thermostat dial 233 are mounted on the front portion of the sidewall 123 and are operative to control the grill 31, heater 80, and drive motor 215, as will be apparent.

In operation, the tank 55 of the applicator 21 is filled with shortening 235. The switch 231 is turned on and the desired temperature for the grill is set by adjustment of the thermostat dial 233. With particular reference to FIGS. 1 and 2, the sandwich buns 15 are placed between the conveyor bars 53 on the pressure plate 169 and are carried downwardly past the bed opening 173 and over the upper portion of the belt 27. When the buns 15 approach the upper portion of the belt 27, they are engaged by the weights 35, as seen in FIG. 2. The weights 35 hold the buns 15 firmly against the belt 27.

Contemporaneously, the belt 27 is being rotated in a clockwise direction, as seen in FIG. 2, passing through the shortening 235. Shortening adhered thereto is brought upwardly and applied to the underside of the buns 15 as they are moved beneath the weights 35. After being "buttered" with the shortening, the buns 15 continue their downward movement, still beneath the weights 35, so that the buns 15 are pressed against the upper surface of the grill 31 for toasting. The pressing action prevents curling or upturning of the edges of the buns. Thereafter, the toasted buns drop into the catch tray 207 for convenient access.

The relatively deep tank 55 is capable of holding a substantial quantity of shortening 225, all of which is accessible to the endless belt 27, so that frequent refilling of the tank is not necessary.

The present toaster can be easily cleaned by unscrewing the knobs 112 to remove the cover 107 and also the framework 90 for the weights 35. The framework 90 lifts directly off the pegs 105 (FIG. 5). The conveyor crossbars 47 are easily removed by pressing the chains 43 or 45 outwardly and out of engagement with the pegs 105. The grill 31 is then easily disengageable from the housing crossbars 159 and 161.

Access is had to the rear of the housing 11 by merely lifting the back panel 181 off the crossbars 151 and 153. The applicator reservoir 25 can be removed by collapsing or knuckling the frame 65 to the position shown in broken lines in FIG. 2 and then disengaging the rearwardly turned flange 61 from the upper edge of the grill 31. The applicator belt 27 is next removed by raising one end of the shaft 75 carrying the upper roller 77, and disengaging the journal 81 (FIG. 5) from the bearing 83 and also disengaging the coupling 85 from the shaft 87. The drip pan 205 and the catch tray 207 are also easily removable, as will be apparent.

Thus, the unique construction of the toaster enables all the components of the toaster to be quickly and easily cleaned, which is important in meeting the rigid sanitation requirements which normally apply to this type of food treatment equipment.

From the foregoing detailed description it will be clear that the toaster of the present invention provides a rapid and convenient means for automatically toasting and buttering food articles in a continuous operation, utilizing a system of weighted elements to press against the food articles to maintain them in a flat condition as they pass over the buttering applicator and the toasting grill.

Various modifications and changes may be made with regard to the foregoing without departing from the spirit of the invention.

I claim:

1. A continuous feed toaster comprising:
    a housing;
    conveyor means mounted in said housing and operative to convey toastable food articles along a predetermined path;
    applicator means mounted in said housing and including a cooking oil reservoir and an endless belt movable through said reservoir for picking up oil thereon, said belt extending adjacent one side of said path for engaging said food articles and applying oil to one side of said food articles on movement of said belt;
    a grill mounted adjacent said one side of said path for toasting said food articles;
    a plurality of movable weights disposed along the side of said path opposite said one side;
    mounting means for suspending said weights in said path and enabling said weights to be moved out of said path by said food articles, whereby said food articles are biased toward said applicator means and said grill; and
    drive means for operating said conveyor means and for moving said belt.

2. A continuous feed toaster as set forth in claim 1 wherein:

said applicator means including belt mounting means having a pair of rollers about which said belt is trained, one of said rollers being carried by said housing and the other of said rollers being disposed in said reservoir, said belt mounting means including a collapsible frame coupling together said pair of rollers whereby collapse of said frame retracts said frame retracts said other of said rollers from said reservoir.

3. A continuous feed toaster as set forth in claim 1 and including:
a heater disposed in heat exchange relationship with said reservoir.

4. A continuous feed toaster as set forth in claim 1 wherein:
said weights comprise eccentrically mounted elements pivotable upwardly upon engagement by said food articles.

5. A continuous feed toaster as set forth in claim 1 and including:
a catch pan removably carried by said housing and disposed beneath said grill and the upper portion of said belt for catching oil drippings and crumbs.

6. A continuous feed toaster as set forth in claim 1 wherein:
said conveyor means includes a pair of chains and a plurality of cross rods extending between and supported by said pair of chains for supporting said food articles during movement thereof along said path.

7. A continuous feed toaster as set forth in claim 1 wherein:
said housing includes a pair of upstanding sidewalls, a backwall including mounting clips removably mounting said back panel to said sidewalls, and a top wall removably fitted upon said sidewalls and said backwall.

8. A continuous feed toaster as set forth in claim 1 wherein:
said housing includes carrying means for carrying said mounting means; and
said mounting means includes a shaft removably engageable with said carrying means and connectable with said drive means.

9. A continuous feed toaster as set forth in claim 4 wherein:
said housing includes a removable cover overlying said weights, said cover including guide fingers extending between the respective weights and constraining said weights against axial shifting.

10. A continuous feed toaster as set forth in claim 4 wherein:
said weights include through bores; and
said toaster includes a plurality of shafts carried by said housing and rotatably disposed through said bores for rotatably mounting said weights.